(No Model.) 3 Sheets—Sheet 1.
R. K. WELCH.
PIPE WELDING MACHINE.
No. 478,669. Patented July 12, 1892.
FIG. 1.
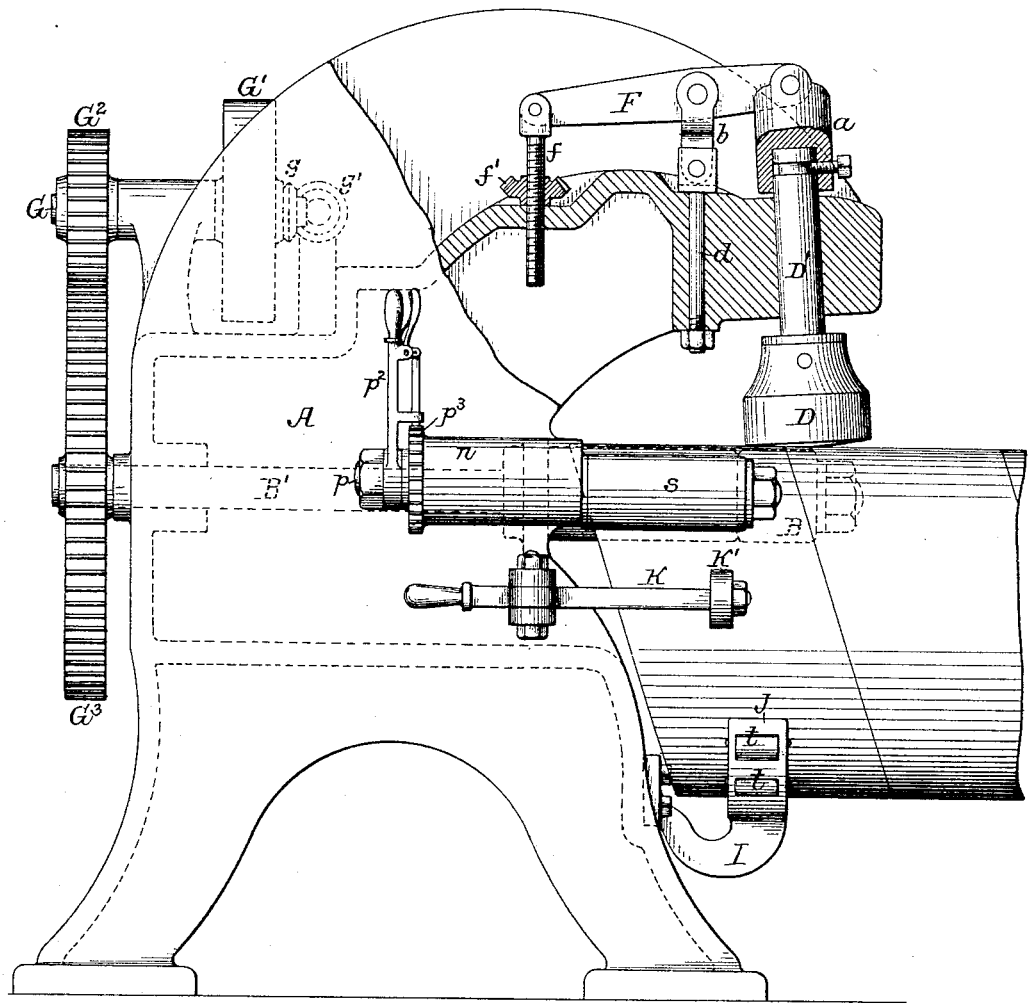
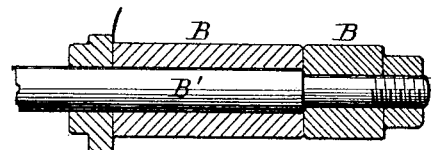
FIG. 4
Witnesses:
Hamilton D. Turner
Fred D. Goodwin
Inventor:
Robert Kemp Welch
by his Attorneys
Howson & Howson

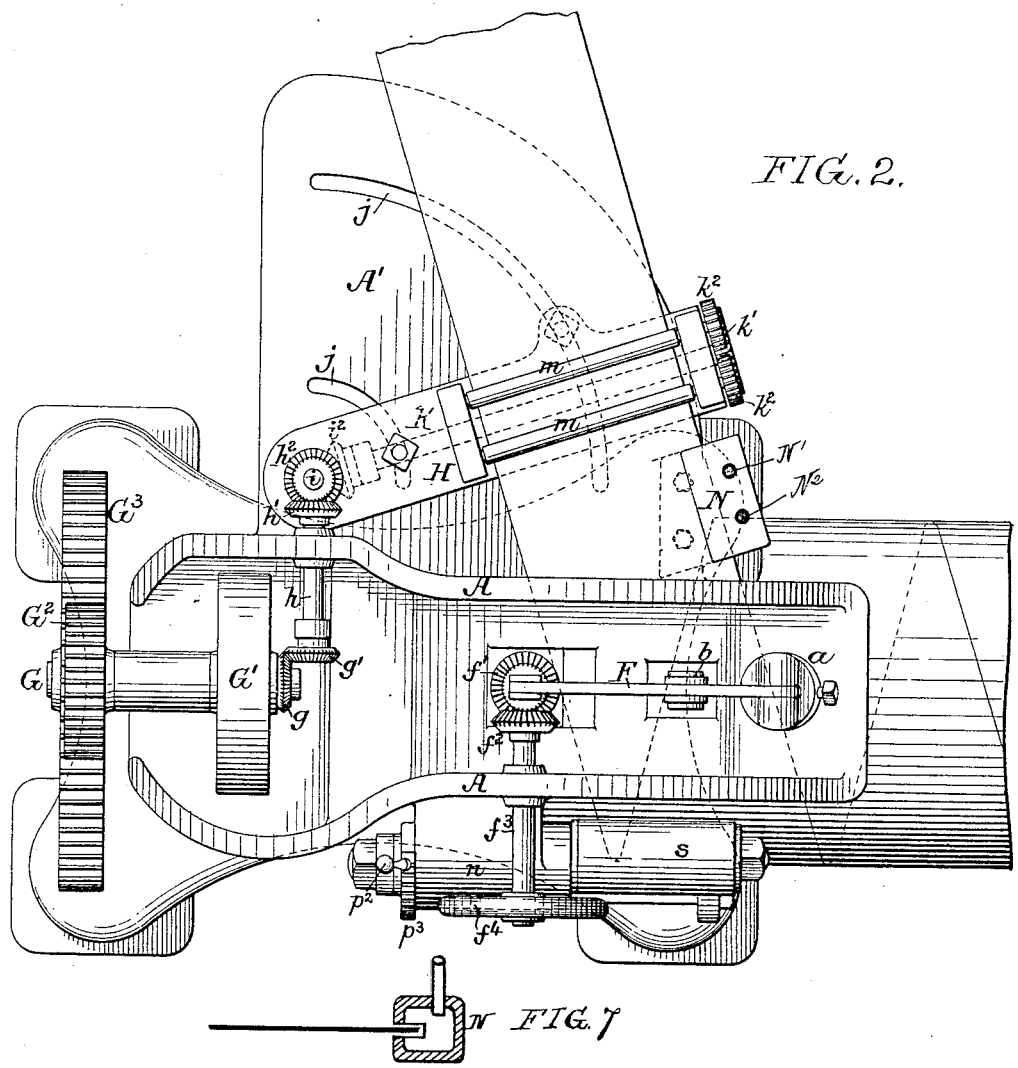

(No Model.) 3 Sheets—Sheet 3.

R. K. WELCH.
PIPE WELDING MACHINE.

No. 478,669. Patented July 12, 1892.

Witnesses:
Hamilton D. Turner
Fred D. Goodwin

Inventor:
Robert Kemp Welch
by his Attorneys
Howson & Howson

UNITED STATES PATENT OFFICE.

ROBERT KEMP WELCH, OF PHILADELPHIA, PENNSYLVANIA, ASSIGNOR OF ONE-HALF TO GEORGE E. SCHLEGELMILCH, OF SAME PLACE.

PIPE-WELDING MACHINE.

SPECIFICATION forming part of Letters Patent No. 478,669, dated July 12, 1892.

Application filed August 5, 1891. Serial No. 401,737. (No model.)

*To all whom it may concern:*

Be it known that I, ROBERT KEMP WELCH, a citizen of the United States, and a resident of Philadelphia, Pennsylvania, have invented certain Improvements in Pipe-Welding Machines, of which the following is a specification.

The object of my invention is to provide a machine for rapidly and effectively welding together at the overlapping portions a coiled strip of sheet metal, so as to produce a pipe or tube having a spirally welded seam. This object I attain in the manner hereinafter set forth, reference being had to the accompanying drawings, in which—

Figure 3:
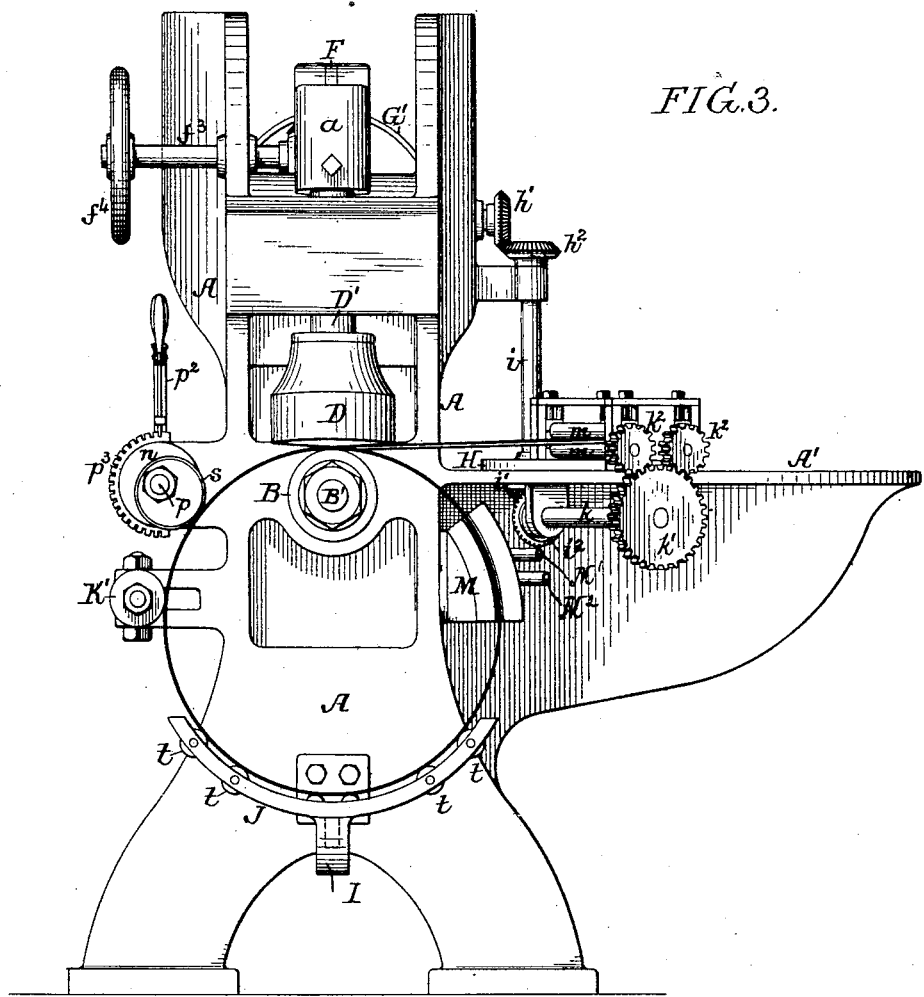
Figure 5:
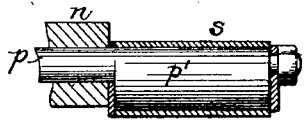
Figure 6:

Figure 1 is a side view, partly in section, of a pipe-welding machine constructed in accordance with my invention. Fig. 2 is a plan view of the same. Fig. 3 is a front view showing the pipe in section and the heating-box N (shown in Fig. 2) removed in order to illustrate the parts behind it. Figs. 4 to 6 are detached views illustrating features of the invention or details of construction. Fig. 7 is a sectional view illustrating the construction of the heating-boxes.

The main frame A of the machine is mounted on suitable legs and has bearings for a shaft B′, which projects forward beyond the frame and carries at its forward end a roll B, which constitutes the internal welding-roll of the machine, the periphery of said roll bearing upon the inside of the pipe or tube at the point where the weld is to be made. This roll is in two parts, as shown in the sectional view, Fig. 4, so that the other part, which receives the pressure in welding, can be renewed without necessitating renewal of the inner part.

The exterior welding-roll D has a slightly coned or beveled under face, which bears upon the pipe at a point directly above the internal welding-roll B and not only presses upon the sheet metal at the point where the strips are being welded together, but also exercises a wiping action upon the edge of the incoming strip where the latter overlaps the edge of the pipe, so that the welded portion of the pipe is, as to its exterior, beveled or reduced to a feather-edge and the formation of objectionable ridges upon the outside of the pipe is prevented.

The roll D is carried by an upright shaft D′, which is guided in a suitable opening in the frame and is swiveled at the upper end in a block $a$, carried by one arm of a lever F, which is hung by a link $b$ to the slotted head of a bolt $d$, secured to the frame of the machine, the other arm of said lever having a depending threaded stem $f$, which is adapted to the internally-threaded hub of a bevel-wheel $f'$, mounted upon a bearing on said frame A, said bevel-wheel $f'$ meshing with a bevel-pinion $f^2$ on a transverse shaft $f^3$, which has a hand-wheel $f^4$, so that by turning the latter the lever F may be operated and the roller D thus caused to bear upon the pipe with any desired degree of pressure.

The driving-shaft G of the machine is mounted in suitable bearings in the upper portion of the frame and has a belt-pulley G′, and on this shaft is also a bevel-pinion $g$, which meshes with a bevel-wheel on a transverse shaft $h$, the latter being geared by bevel-wheels $h'$ $h^2$ to an upright-shaft $i$, which in turn is geared by bevel-wheels $i'$ $i^2$ to a horizontal shaft $k$, the latter being geared by spur-wheels $k'$ $k^2$ to the shafts of the lowermost of two pairs of feed-rolls $m$, these rolls being carried by a frame H, which is pivoted to a bushing of the shaft $i$, and can be swung around so as to assume different angles in respect to the roll-shaft B′, said frame being secured in position after adjustment by means of bolts adapted to segmental slots $j$ in a table A′, projecting from the main frame and serving as a support for the roll-carrying frame H.

The roll-shaft B′ is driven from the shaft G through the medium of a spur-pinion G² and spur-wheel G³, as shown in Fig. 1.

To a bearing $n$ on one side of the frame A is adapted a shaft $p$, which has at the front end an eccentric portion $p'$, and upon the latter is mounted a sleeve $s$, (Figs. 5 and 6,) which serves to bear upon the side of the pipe at a point some distance in advance of the welding-rolls B D, the eccentric bearing for said sleeve $s$ permitting the adjustment of the same nearer to or farther from the welding-rolls, depending upon the diameter of the pipe which is being made. The rear end of the shaft $p$ has an operating-arm $p^2$, with locking-bolt operating in conjunction with a notched semicircular arm $p^3$, so that said arm and its shaft can be locked in any desired position of adjustment.

Projecting from the front of the machine is a foot I, upon which is mounted a curved bar J, provided with anti-friction rollers $t$, serving as a support for the lower portion of the pipe, said bar J being detachable, so that it can be replaced by another when a different-sized pipe is being made. Between the supporting-bar J and the adjustable bearing-roll $s$ is a lever K, hung to the frame of the machine and having at the front end a roller K′, this roller providing a bearing for the forward end of the sheet-metal strip when the formation of a pipe has just commenced and serving to direct said forward end of the strip properly into the curved supporting-bar J.

Mounted upon suitable brackets secured, respectively, to the frame A and table A′ are two heating-boxes M and N, each heated by means of a supply of air and gas introduced through suitable pipes M′ M², and N′ N², as set forth in my application filed June 24, 1891, Serial No. 397,279, the face of the box M having a segmental slot for the reception of the end of the pipe, while the box N has a straight slot for the reception of that edge of the strip of sheet metal which is to be welded to the edge of the pipe, the boxes being so arranged that their slotted portions face each other. (See Fig. 7.) By this means the edge of the pipe and the edge of the incoming strip of sheet metal which is to overlap the edge of the pipe are heated to the welding-point before they reach the rolls B and D, so that when they reach said rolls the welding of the parts can be readily effected by the combined pressure and wiping action of the roll D.

Having thus described my invention, I claim and desire to secure by Letters Patent—

1. The combination, in a spiral-weld-pipe machine, of the inner roll, the periphery of which supports the pipe, with the outer pressing-roll turning on an upright axis and having a lower conical face pressing upon the pipe, so as to exert a wiping action upon the joint, substantially as specified.

2. The combination, in a pipe-welding machine, of the inner supporting-roll with the outer pressing-roll having a lower conical face and an upright shaft, and pressure devices to which said shaft is swiveled, substantially as specified.

3. The combination of the inner supporting-roll, the outer flat-faced and swiveled pressure-roll, a pressure-lever having a block carrying said swiveled roll, a threaded rod connected to said lever, a nut engaging with said rod, and gearing for turning said nut, substantially as specified.

4. The combination, in a pipe-welding machine, of the welding-rolls with a bearing-roll in advance of said welding-rolls, and an eccentric carrier for said bearing-roll whereby it can be adjusted nearer to or farther from the welding-rolls, substantially as specified.

5. The combination, in a pipe-welding machine, of the welding-rolls with two slotted heating-boxes, one facing in one direction and receiving the edge of the pipe and the other facing in the opposite direction and receiving the edge of the incoming strip, whereby said edges are heated before they reach the welding-rolls, substantially as specified.

In testimony whereof I have signed my name to this specification in the presence of two subscribing witnesses.

ROBERT KEMP WELCH.

Witnesses:
EUGENE ELTERICH,
HARRY SMITH.